United States Patent [19]
Tayebati et al.

[11] Patent Number: 6,025,950
[45] Date of Patent: Feb. 15, 2000

[54] MONOLITHIC ALL-SEMICONDUCTOR OPTICALLY ADDRESSED SPATIAL LIGHT MODULATOR BASED ON LOW-PHOTOCONDUCTIVE SEMICONDUCTORS

[75] Inventors: Parviz Tayebati, Watertown; Ergun Canoglu, Waltham, both of Mass.

[73] Assignee: CoreTek, Inc., Burlington, Mass.

[21] Appl. No.: 09/122,955

[22] Filed: Jul. 27, 1998

Related U.S. Application Data

[60] Provisional application No. 60/059,704, Sep. 22, 1997.

[51] Int. Cl.[7] ........................ H01L 29/06; H01L 31/0328
[52] U.S. Cl. ............................................. 359/244; 359/248
[58] Field of Search .................... 359/244, 245, 359/248, 299; 257/21

[56] References Cited

U.S. PATENT DOCUMENTS

| | | | |
|---|---|---|---|
| 5,485,014 | 1/1996 | Jain et al. | 257/21 |
| 5,488,504 | 1/1996 | Worchesky et al. | 359/248 |
| 5,508,829 | 4/1996 | Freeouf et al. | 359/3 |
| 5,539,542 | 7/1996 | Picoli et al. | 359/6 |
| 5,559,613 | 9/1996 | Deveaud-Pledran et al. | 257/21 |
| 5,627,383 | 5/1997 | Cunningham et al. | 257/85 |
| 5,637,883 | 6/1997 | Bowman et al. | 257/21 |
| 5,668,647 | 9/1997 | Nuss | 359/4 |
| 5,698,863 | 12/1997 | Pelekanos | 257/21 |

OTHER PUBLICATIONS

Tayebati et al., "An optically–addressable modulator based on low –temperature –growth MQW GaAlAs," Appl. Phys. Lett 71(4) Jul. 28, 1997, pp. 446–448.

Tayebati et al. "High–speed all–semiconductor OASLM," Appl. Phys. Lett. 71(12),pp. 1610–1612, Sep. 22, 1997.

Canoglu et al., "High Resolution SLM With Distributed Photorefractive Devices," IEEE Phot. Tech. Lett., vol. 10, No. 2, pp. 221–223, Feb. 1998.

*Primary Examiner*—Scott J. Sugarman
*Assistant Examiner*—Margaret Burke
*Attorney, Agent, or Firm*—Pandiscio & Pandiscio

[57] ABSTRACT

An optically addressed spatial light modulator (OASLM), and an optical pattern processor employing the same. An embodiment of the OASLM includes a transparent electrode; a buffer layer; a detector region; and a modulator region, wherein the detector and modulator regions are optically isolated and resist electron movement therebetween. In one embodiment, the detector region includes a photoconductive semiconductor region with a higher band gap than the modulator region and the modulator region comprises a low-photoconductive semiconductor material.

12 Claims, 7 Drawing Sheets

Comparison Of The Relative Characteristics Of OASLM 5, OASLM 100, OASLM 200

| OASLM | Sensitivity | Resolution | Modulation | Readout-To-Control Ratio | Monolithic Construction? |
|---|---|---|---|---|---|
| OASLM 5 | 1 microjoule/cm$^2$ | 7-10 microns | 60% | 0.1 | no |
| OASLM 100 | 1 microjoule/cm$^2$ | 10 microns | 60% | 150.0 | yes |
| OASLM 200 | 1 microjoule/cm$^2$ | 4.3 microns | 60% | 0.1 | yes |

MONOLITHIC ALL-SEMICONDUCTOR OPTICALLY ADDRESSED SPATIAL LIGHT MODULATOR BASED ON LOW-PHOTOCONDUCTIVE SEMICONDUCTORS

REFERENCE TO PENDING PRIOR PROVISIONAL APPLICATION

This patent application claims benefit of pending prior U.S. Provisional Patent Application Ser. No. 60/059,704, filed Sep. 22, 1997 by Ergun Canoglu and Parviz Tayebati for OPTICAL PATTERN RECOGNITION SYSTEMS BASED ON REFLECTIVE OPTICALLY ADDRESSED SPATIAL LIGHT MODULATORS.

FIELD OF THE INVENTION

This invention relates to optical devices in general, and more particularly to optically addressed spatial light modulators.

BACKGROUND OF THE INVENTION

Light modulators are well known in the art. In general, light modulators modulate light entering the light modulator in accordance with the level of a control supplied to the light modulator. Depending on the construction of the light modulator, the level of the control will dictate (1) the extent of a change in the amplitude of the light emerging from the light modulator, or (2) the extent of a change in the polarization of the light emerging from the light modulator, or (3) the extent of a change in the phase of the light emerging from the light modulator, etc.

Figure 1:
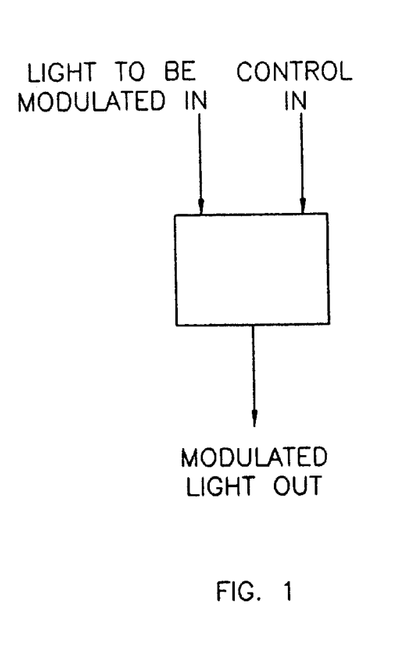
FIG. 1 is a schematic diagram of one form of light modulator.
Figures 2, 3:
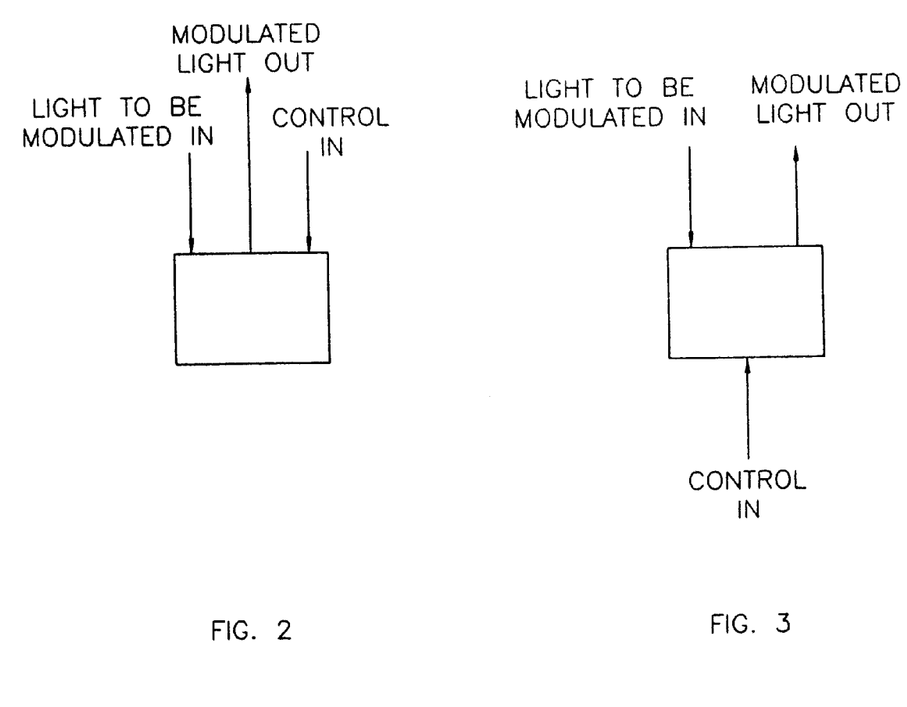
FIG. 2 is a schematic diagram of another form of light modulator.
FIG. 3 is a schematic diagram of still another form of light modulator.

Light modulators can be constructed so as to pass or reflect the modulated light, and can use different surfaces of the light modulator to receive the control. For example, FIGS. 1–3 schematically illustrate three common light modulator constructions.

One type of light modulator of special interest in the present invention is a so-called optically addressed light modulator. In this type of light modulator, the control for the light modulator is optically based.

Individual light modulators can be grouped together in different ways so as to provide particular constructions. One construction of special interest in the present invention is a so-called spatial light modulator, which comprises a two dimensional array of individual light modulators.

The present invention is principally concerned with optically addressed spatial light modulators (hereinafter frequently referred to as "OASLM's").

There are numerous commercial applications for OASLM's.

For example, OASLM's can be used to boost a low light source, e.g., for night vision applications. In this situation, the light obtained from the real-life light source is used as the control. More particularly, light from a robust, regulated light source is fed into the light modulator, and the control is used to modulate the light from the regulated light source into a corresponding modulated output.

OASLM's can also be used to convert incoherent light into coherent light. This can be important in some optical systems which need to use coherent light. In this situation, the incoherent light is used as the control. More particularly, coherent light from a regulated light source is fed into the light modulator, and the control is used to modulate the coherent light from the regulated light source into a corresponding modulated output.

OASLM's can also be used to convert the wavelength of light. For example, the OASLM could read infrared light and convert it to visible light.

OASLM's can also be used as a short term storage device, e.g., real-time holographic images can be stored for several hundred microseconds in an OASLM.

Figure 4:
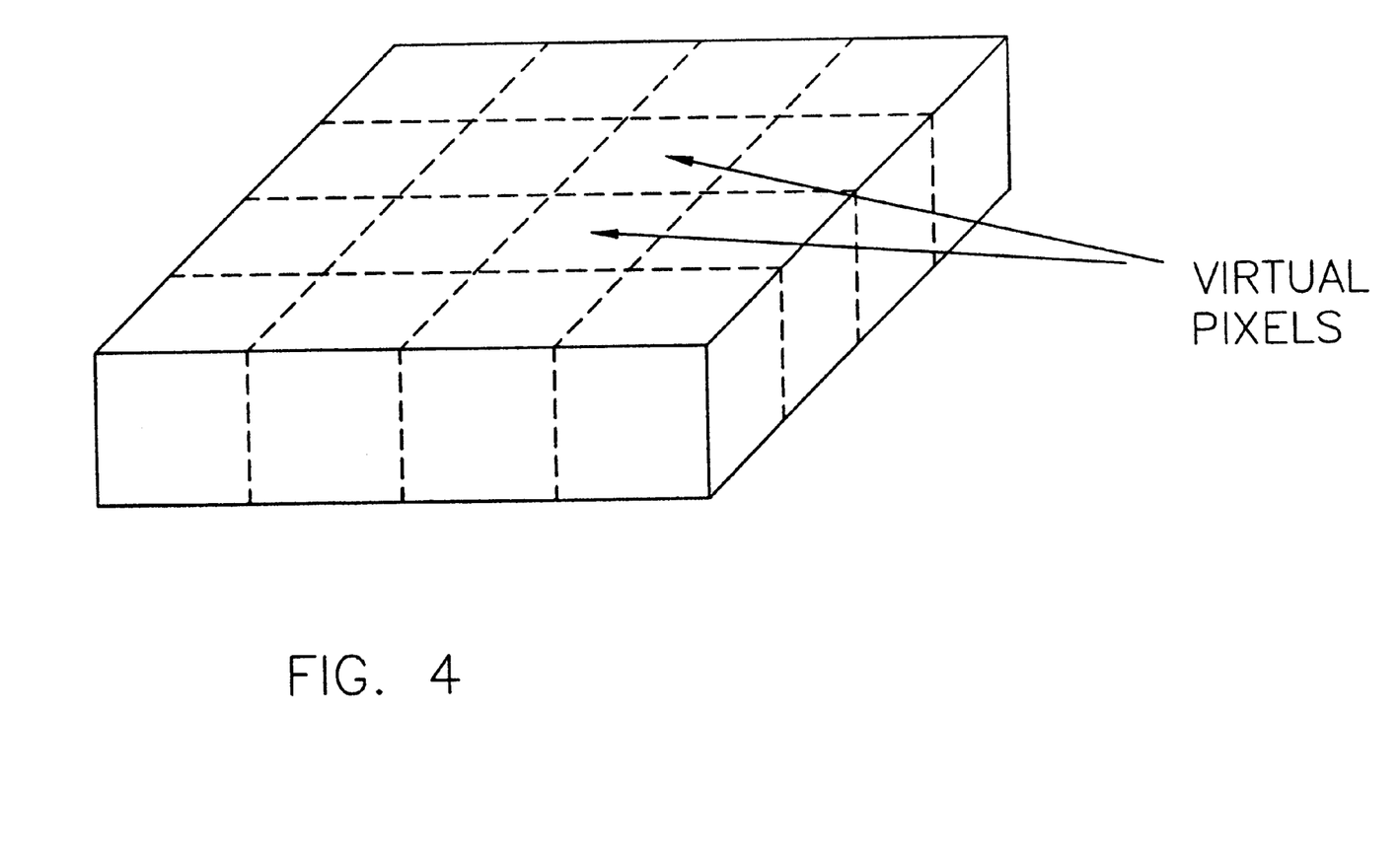
FIG. 4 is a schematic diagram of an OASLM illustrating the virtual pixel structure of the device.

In practice, in many applications it has been found desirable to construct OASLM's without having discrete pixel structures within the OASLM. In essence, it has been found desirable to construct OASLM's having a virtual pixel structure. See, for example, FIG. 4, which schematically illustrates an OASLM having a virtual pixel structure.

When constructing an OASLM, it is generally important that there be good lateral isolation between adjacent virtual pixels, so as to avoid cross-talk and achieve good device resolution. It is also generally important that the OASLM have good sensitivity, so that a low-level light source can be used as the control. The OASLM should also be relatively efficient, in the sense that the light modulator should absorb relatively little of the light which is to be modulated. And the OASLM should also be able to provide a good degree of modulation, so as to deliver an output which is more easily discernible. It is also generally important that the OASLM be able to operate at a relatively high readout-to-control ratio, so that the light modulator's output can be more easily used and so that the intensity-related requirements of a following optical or electronic subsystem can be relaxed. The OASLM should also be able to operate at a relatively high speed, so that the OASLM can be used in a broad range of device applications. And the OASLM should, ideally, have a monolithic construction, so that the OASLM can be more easily fabricated.

Figure 5:
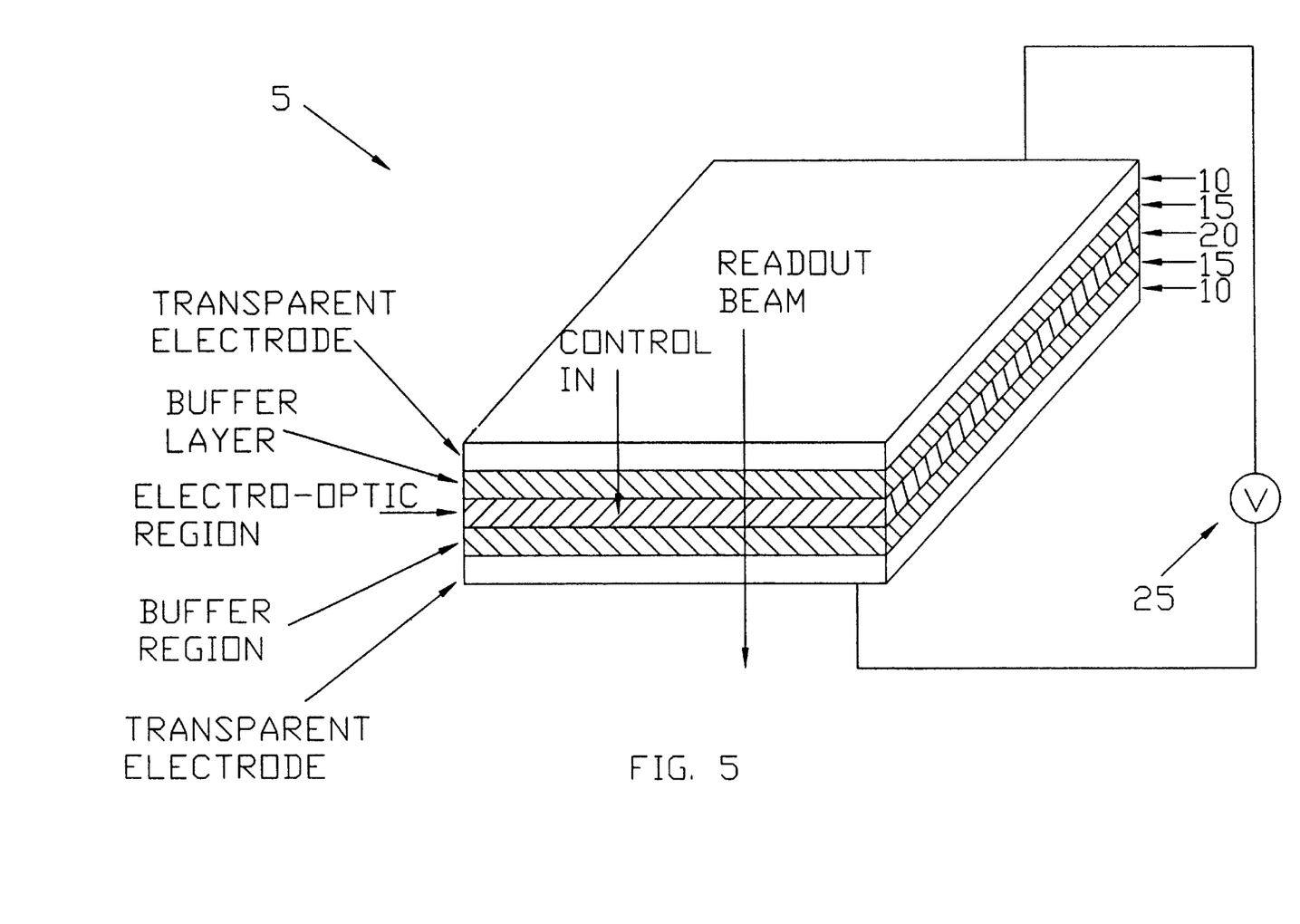
FIG. 5 is a schematic diagram of an OASLM.

Looking next at FIG. 5, an OASLM 5 is shown. OASLM 5 generally comprises a pair of transparent electrodes 10, a pair of buffer layers 15 and an electrooptic region 20.

Transparent electrodes 10 typically comprise a transparent conductive material (e.g., cadmium tin oxide or indium tin oxide) or a semiconductor material (e.g., n-doped or p-doped gallium arsenide or gallium aluminum arsenide).

Buffer layers 15 typically comprise dielectric layers (e.g., phosphate silica glass).

Electrooptic region 20 typically comprises a semiconductor electrooptic material, e.g., multiple quantum wells (MQW's) made of alternating layers of gallium aluminum arsenide and gallium arsenide.

Transparent electrodes 10 apply a uniform field across electrooptic region 20 when OASLM 5 is connected to an appropriate voltage source 25. When control light thereafter enters OASLM 5 and strikes electrooptic region 20, the control light interacts with the electrooptic material, causing electron formation. This electron formation leads to a change in the electric field within the electrooptic region 20, which in turn leads to a change, on a localized basis, in the electrooptic material. This localized change in the electrooptic material in turn leads to a change, on a localized basis, in the modulation of the readout beam as the readout beam enters OASLM 5 and passes through electrooptic region 20.

In OASLM 5, buffer layers 15 serve as electron binders, essentially keeping the electrons from (1) being "sucked" out of the device longitudinally, which causes a loss of device efficiency, and (2) moving laterally, which causes each virtual pixel to be less well defined, and hence leads to a loss of device resolution.

In OASLM 5, electrooptic region 20 simultaneously acts as both (1) the detector of the control light, and (2) the modulator of the readout beam.

With OASLM 5, if electrooptic region 20 is made relatively thick, a relatively large amount of electrooptic material will be present in the device and the OASLM can provide good sensitivity and good modulation. However, since a relatively thick electrooptic region 20 results in the buffer layers 15 being spaced relatively far apart, substantial lateral electron migration can occur, which results in reduced device resolution.

On the other hand, if electrooptic region 20 is formed relatively thin, so that buffer layers 15 are spaced relatively close together, lateral electron migration will be restricted and the OASLM will provide good resolution. However, since the electrooptic region 20 is relatively thin, a relatively small amount of electrooptic material will be present in the device and the OASLM will have relatively poor sensitivity and relatively poor modulation.

In addition to the foregoing, with OASLM 5, since the same electrooptic region 20 serves as both the detector for the control light and the modulator for the readout beam, a relatively low readout-to-control ratio must be used so as to avoid having the readout beam "wash out" the effect of the control light.

Furthermore, with OASLM 5, the readout beam has to pass completely through the device. This means that OASLM 5 cannot be opaque. Unfortunately, however, current monolithic fabrication techniques generally require that semiconductor layers be grown on a substrate which is effectively opaque. As a result, OASLM 5 is not capable of being fabricated using a monolithic process.

OBJECTS OF THE INVENTION

As a result, one object of the present invention is to provide a novel OASLM which has good lateral isolation between adjacent virtual pixels, so as to avoid cross-talk and achieve good device resolution.

Another object of the present invention is to provide a novel OASLM which has good sensitivity, so that a low-level light source can be used as the control.

Another object of the present invention is to provide a novel OASLM which is relatively efficient, in the sense that the light modulator will absorb relatively little of the light which is to be modulated.

And a further object of the present invention is to provide a novel OASLM which is able to provide a good degree of modulation, so as to deliver an output which is more easily discernible.

Still another object of the present invention is to provide a novel OASLM which has a relatively high readout-to-control ratio, so that the light modulator's output can be more easily used and so that the intensity-related requirements of a following optical or electronic subsystem can be relaxed.

Yet another object of the present invention is to provide a novel OASLM which is able to operate at a relatively high speed, so that the OASLM can be used in a broad range of device applications.

And another object of the present invention is to provide a novel OASLM which has a monolithic construction, so that the device can be more easily fabricated.

And still another object of the present invention is to provide a novel optical pattern processor which utilizes a novel OASLM constructed in accordance with the present invention.

SUMMARY OF THE INVENTION

These and other objects are achieved by the provision and use of a novel OASLM.

In one form of the present invention, the novel OASLM comprises an optically addressed spatial light modulator (OASLM) comprising a transparent electrode; a buffer layer; a detector region; and a modulator region, wherein the detector region and the modulator region are optically and electronically isolated from one another.

In another form of the invention, the novel OASLM comprises an optically addressed spatial light modulator (OASLM) comprising a transparent electrode; a first buffer layer; a first detector/modulator region; a second buffer layer; a second detector/modulator region; and a third buffer layer.

In still another form of the invention, a novel OASLM is incorporated into a novel optical pattern processor. In this form of the invention, the novel optical pattern processor comprises a novel OASLM; a lens for performing a Fourier-transformation of a pair of images A and B so as to produce a pair of transformed images A' and B', and for superimposing, at an angle, the transformed image $((A')^2 + (B')^2 + (A'^*B') + (A'B'^*))$ on the OASLM, where $A'^*$ and $B'^*$ are complex conjugates; and a detector array for analyzing the term $(A'^*B')$ or $(A'B'^*)$ of the superimposed transformed image.

BRIEF DESCRIPTION OF THE DRAWINGS

Still other objects and features of the present invention will be more fully disclosed or rendered obvious by the following detailed description of the preferred embodiments of the invention, which is to be considered together with the accompanying drawings wherein.

DETAILED DESCRIPTION OF THE PREFERRED EMBODIMENTS

This patent application claims benefit of pending prior U.S. Provisional Patent Application Ser. No. 60/059,704, filed Sep. 22, 1997 by Ergun Canoglu and Parviz Tayebati for OPTICAL PATTERN RECOGNITION SYSTEMS BASED ON REFLECTIVE OPTICALLY ADDRESSED SPATIAL LIGHT MODULATORS, which document is hereby incorporated herein by reference.

Figure 6:
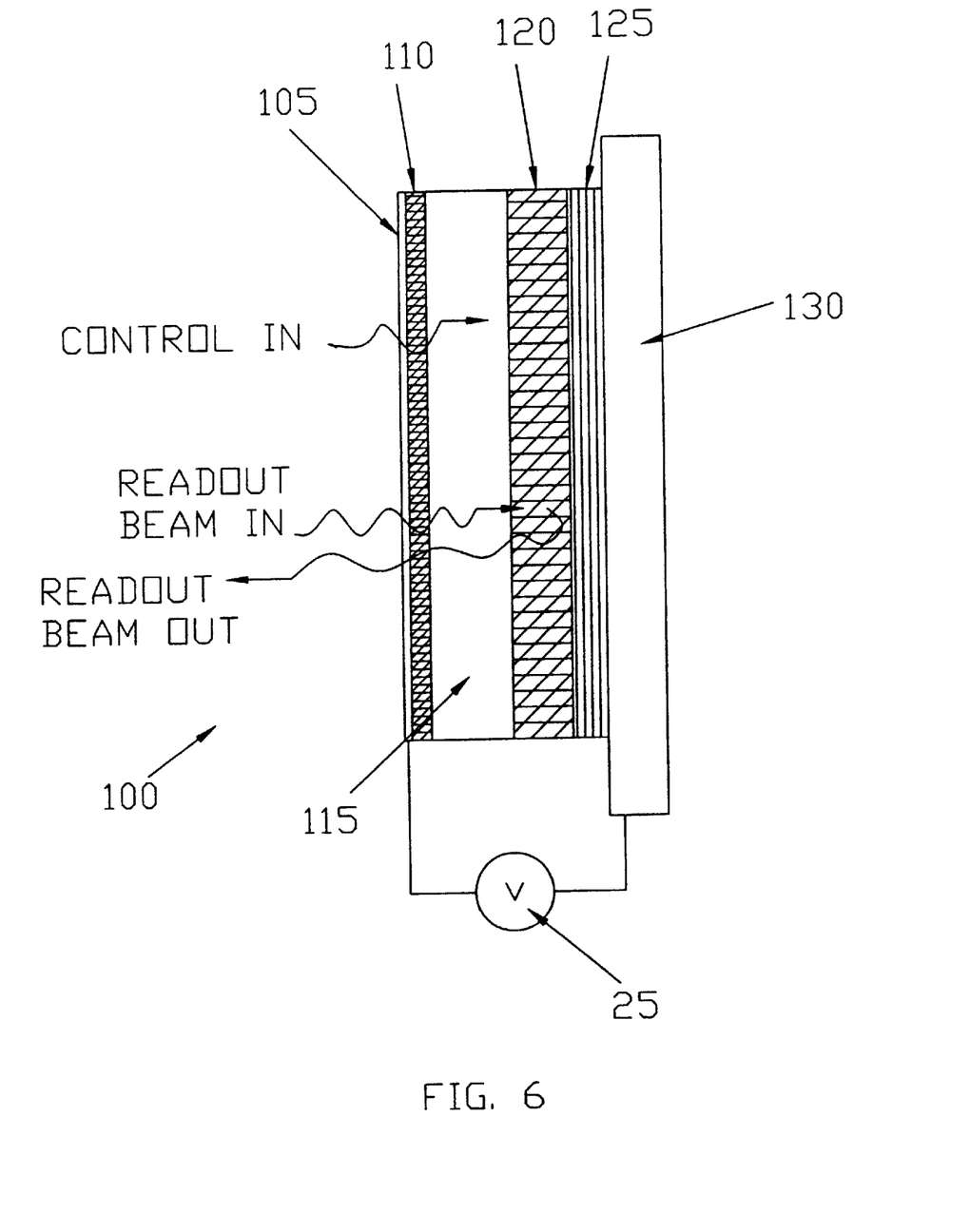
FIG. 6 is a schematic diagram of a novel OASLM formed in accordance with the present invention.

Looking next at FIG. 6, there is shown a novel OASLM 100 constructed in accordance with the present invention. OASLM 100 generally comprises a transparent electrode 105, a buffer layer 110, a detector region 115, a modulator region 120, a mirror electrode 125, and a conductive substrate 130.

Transparent electrode 105 comprises a semiconductor material such as n-doped or p-doped gallium arsenide or gallium aluminum arsenide. Alternatively, if OASLM 100 is not going to be monolithically grown, transparent electrode 105 could comprise cadmium tin oxide or indium tin oxide.

Buffer layer 110 comprises a semiconductor material which has low photoconductive characteristics, such as low temperature growth gallium aluminum arsenide. Alternatively, if OASLM 100 is not going to be monolithically grown, buffer layer 100 could be a dielectric material such as phosphate silica glass.

Detector region 115 comprises a photoconductive semiconductor material, or a semi-photoconductive semiconductor material, such as gallium aluminum arsenide or gallium arsenide.

Detector region 115 has a thickness sufficient to absorb substantially all of the control light entering OASLM 100. As a result, the control light does not pass through detector region 115 and therefore does not affect modulator region 120.

At the same time, the semiconductor material used to form detector region 115 has a higher bandgap than the material used to form modulator region 120, so that the higher bandgap detector region 115 is effectively transparent to the readout beam. As a result, the readout beam passes completely through detector region 115 to modulator region 120, and does not affect detector region 115.

Modulator region 120 comprises a low-photoconductive semiconductor material. Preferably, modulator region 120 comprises a low temperature growth semiconductor material such as gallium aluminum arsenide (GaAlAs).

Mirror electrode 125 comprises a semiconductor material such as alternating layers of gallium aluminum arsenide and gallium arsenide, or alternating layers of aluminum arsenide and gallium arsenide.

Conductive substrate 130 comprises a semiconductor material such as p-doped or n-doped gallium arsenide.

Detector region 115 and modulator region 120 are optically and electrically isolated from one another.

Transparent electrode 105, and conductive substrate 130 and mirror electrode 125, establish an initial electric field in detector region 115 when OASLM 100 is connected to an appropriate voltage source 25. When control light thereafter enters OASLM 100, the control light is absorbed by detector region 115, which causes a change in the electric field in the detector region. More particularly, as the control light is absorbed by the detector region, the control light nulls out, on a localized basis, the electric field applied to the detector region by electrodes 105 and 125, thereby reducing, on a localized basis, the electric field in the detector region. Detector region 115 is thick enough to absorb substantially all of the control light, so that none of the control light penetrates past the detector region.

As the control light causes the electric field in detector region 115 to drop, on a localized basis, the electric field rises correspondingly, on a localized basis, in modulator region 120. This causes the optical characteristics of modulator region 120 to change on a localized basis. The input readout beam passes completely through detector region 115, is modulated in modulator region 120, bounces off mirror electrode 125, is modulated again as the readout beam passes back through modulator region 120, and returns out the front of the OASLM.

It will be appreciated that, in OASLM 100, buffer layers are not provided adjacent to either side of the modulator region 120. In order to keep electrons from migrating laterally within modulator region 120, which reduces resolution, modulator region 120 is formed out of a low-photoconductive material. On account of the fact that modulator region 120 is formed out of this low-photoconductive material, the electrooptic material essentially acts as its own buffer, and buffer layers do not need to be provided adjacent to either side of modulator region 120. The low-photoconductive characteristics desired for modulator region 120 is achieved by using low temperature growth semiconductor material such as low temperature growth gallium aluminum arsenide.

The use of low-photoconductive semiconductor material in modulator region 120 also has an additional advantage, in that it prevents electron flow from modulator region 120 back into detector region 115. In essence, in OASLM 100, electrons are prevented from flowing both laterally within modulator region 120, and longitudinally back into detector region 115, due to the use of low-photoconductive semiconductor material in modulator region 120.

Figure 7:
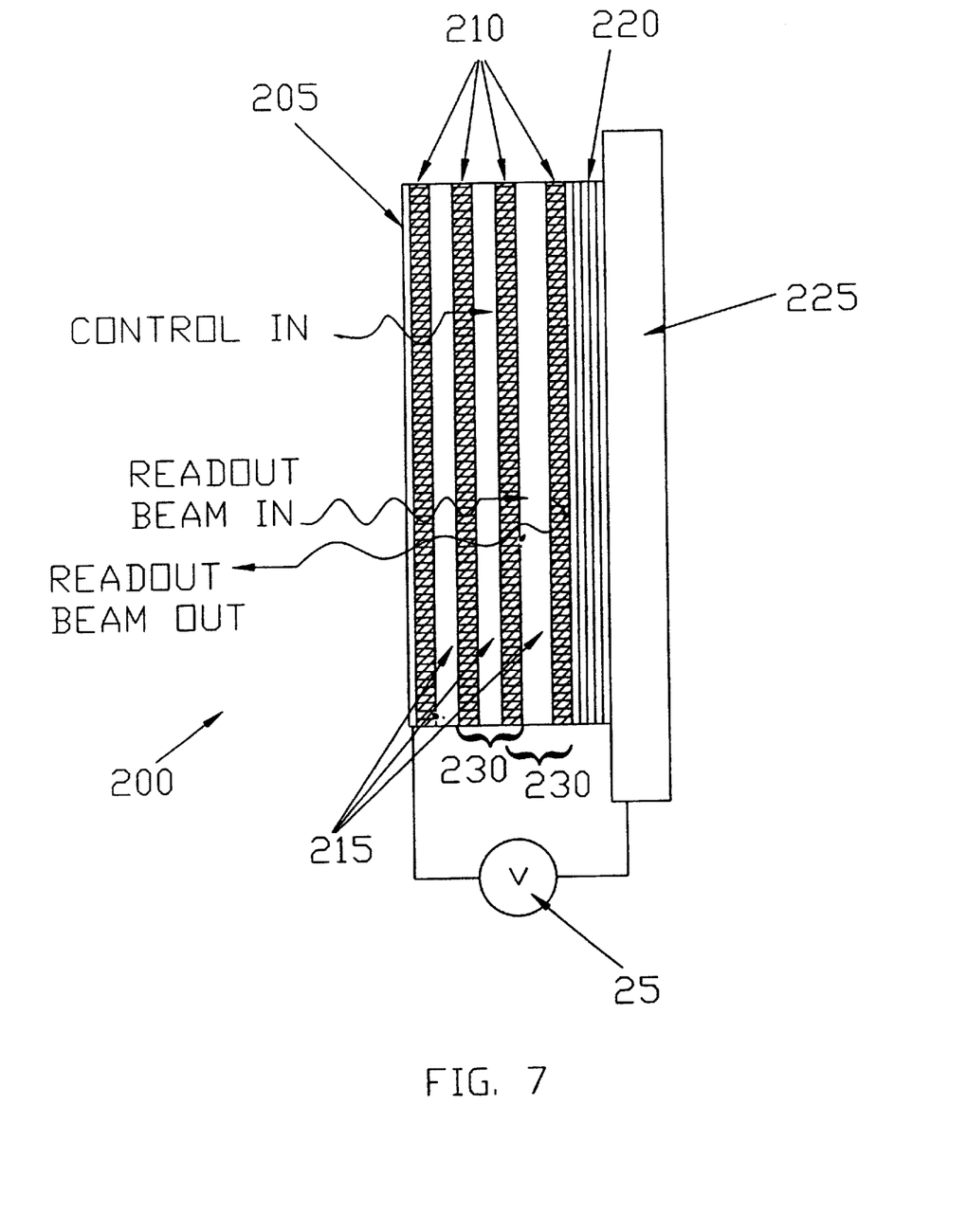
FIG. 7 is a schematic diagram of another novel OASLM formed in accordance with the present invention.

Another novel OASLM 200 is shown in FIG. 7. OASLM 200 generally comprises a transparent electrode 205, a plurality of buffer layers 210, a plurality of electrooptic regions 215, a mirror electrode 220, and a conductive substrate 225.

Transparent electrode 205 comprises a semiconductor material such as n-doped or p-doped gallium arsenide or gallium aluminum arsenide. Alternatively, if OASLM 200 is not going to be grown monolithically, transparent electrode 205 could comprise cadmium tin oxide or indium tin oxide.

Buffer layers 210 comprise a low photoconductive semiconductor material such as low temperature growth gallium aluminum arsenide. Alternatively, if OASLM 200 is not going to be grown monolithically, buffer layer 210 could comprise a dielectric material such as phosphate silica glass.

Electrooptic regions 215 comprise a semiconductor electrooptic material, e.g. bulk semiconductor or multiple quantum wells (MQW's) of which the absorption and refractive index can be modulated through the Franz-Keldysh effect (FKE) or the quantum confined Stark effect (QCSE). For example, electrooptic regions 215 could be bulk gallium arsenide or bulk gallium aluminum arsenide, or multiple quantum wells made of alternating layers of gallium arsenide and gallium aluminum arsenide.

Mirror electrode 220 comprises a semiconductor material such as alternating layers of gallium aluminum arsenide and gallium arsenide, or alternating layers of aluminum arsenide and arsenide.

Conductive substrate 225 comprises a semiconductor material such as p-doped or n-doped gallium arsenide.

The operation of OASLM 200 is somewhat similar to the OASLM 5 shown in FIG. 5, in the sense that the electrooptic material in electrooptic regions 215 acts as both the detector of the control light and the modulator of the readout beam. However, with OASLM 5 shown in FIG. 5, if the electrooptic region 20 is made relatively thick so as to achieve good sensitivity and modulation, resolution suffers due to excessive lateral electron migration. On the other hand, if the electrooptic region 20 of OASLM 5 is made too thin, poor sensitivity and poor modulation results, even if good resolution is achieved. OASLM 200, on the other hand, by providing multiple thin electrooptic regions 215 separated by multiple buffer layers 210, is simultaneously able to provide good resolution, good sensitivity and good modulation. This is because the thickness of each electrooptic region 215 is much less than the overall device thickness, thereby permitting less lateral electron migration. At the same time, however, since the electrooptic section of OASLM 200 is the sum of all of the electrooptic regions 215 taken together, the interaction length of the overall electrooptic section of OASLM 200 can be substantial, thereby providing substantial device sensitivity and substantial device modulation.

In practice, good results have been achieved by providing three sets of the substructure 230 (i.e., buffer layer 210/electrooptic region 215/buffer layer 210).

EXAMPLE 1

OASLM 100 may be formed as follows.

First, an n+($10^{18}$ cm$^{-3}$) 1000 angstrom GaAs layer is grown on an n+ GaAs substrate at 620 degrees C.

Then a 22 period quarter wave stack mirror, of AlAs (734 angstrom)/$Ga_{0.9}Al_{0.1}As$ (600 angstrom), is grown on top of the structure.

Next, a 120.5 period, AlAs/GaAs low temperature growth (320 degrees C.) multiple quantum well (MQW) region is grown on top of the structure. Halfway through the MQW region, MBE growth is stopped and the sample annealed at 640 degrees C. for 10 minutes to relieve stress from excessive arsenic. The annealing process is repeated after the remainder of the MQW region is completed.

Next, a 3 micrometer thick detector region is grown, at 620 degrees C., out of $Al_{0.15}Ga_{0.85}As$.

Then a 5000 angstrom thick p+($5\times10^{18}$ cm$^{-3}$) $Al_{0.30}Ga_{0.70}As$ layer, and a 50 angstrom thick p+($7\times10^{18}$ cm$^{-3}$) GaAs layer, are grown.

In practice, OASLM 100 can be made quite small, e.g., as small as 4 micrometers in thickness.

And in practice, OASLM 100 has also proven to be a fast device, providing response times ranging between picoseconds and microseconds, depending on the intensity of the control light.

EXAMPLE 2

OASLM 200 can be formed as follows. First, conductive substrate 225 and mirror electrode 220 are formed as in Example 1 above.

Next, three sets of the substructure 230 (i.e., buffer layer 210/electrooptic region 215/buffer layer 210) are formed. Each set of the substructure 230 comprises a 76 period thick multiple quantum well (MQW) region of 40 angstrom thick $Al_{0.1}Ga_{0.9}As$/50 angstrom thick GaAs, sandwiched between 4000 angstrom thick layers of low temperature growth gallium aluminum arsenide, e.g., $Al_{0.3}Ga_{0.7}As$.

In practice, OASLM 200 can be made quite small, e.g., as small as 1–3 micrometers in thickness.

And in practice, OASLM 200 has also proven to be a fast device, providing response times ranging between picoseconds and microseconds, depending on the intensity of the control light.

RELATED PUBLICATIONS

Additional details regarding OASLM's formed in accordance with the present invention are provided in:

(1) "An optically addressed modulator based on low-temperature-grown multiple quantum well GaAlAs" by Parviz Tayebati, Christos Hantzis, Ergun Canoglu and Robert N. Sacks, Appl. Phys. Lett. 71 (4), Jul. 28, 1997, which publication is attached hereto as Appendix A, and which publication is hereby incorporated herein by reference;

(2) "High-speed all-semiconductor optically address spatial light modulator" by Parviz Tayebati, Ergun Canoglu, Christos Hantzis and Robert N. Sacks, Appl. Phys. Lett. 71 (12), Sep. 22, 1997, which publication is attached hereto as Appendix B, and which publication is hereby incorporated herein by reference; and (3) "High-Resolution Spatial Light Modulation with Distributed Photorefractive Devices" by Ergun Canoglu, Parviz Tayebati, Christos Hantzis, Annick Jehanno, and Robert N. Sacks, IEEE Photonics Technology Letters, Vol. 10 No. 2, February 1998, which publication is attached hereto as Appendix C, and which publication is hereby incorporated herein by reference.

COMPARISON OF THE RELATIVE CHARACTERISTICS OF OASLM 5, OASLM 100 and OASLM 200

Figure 8:
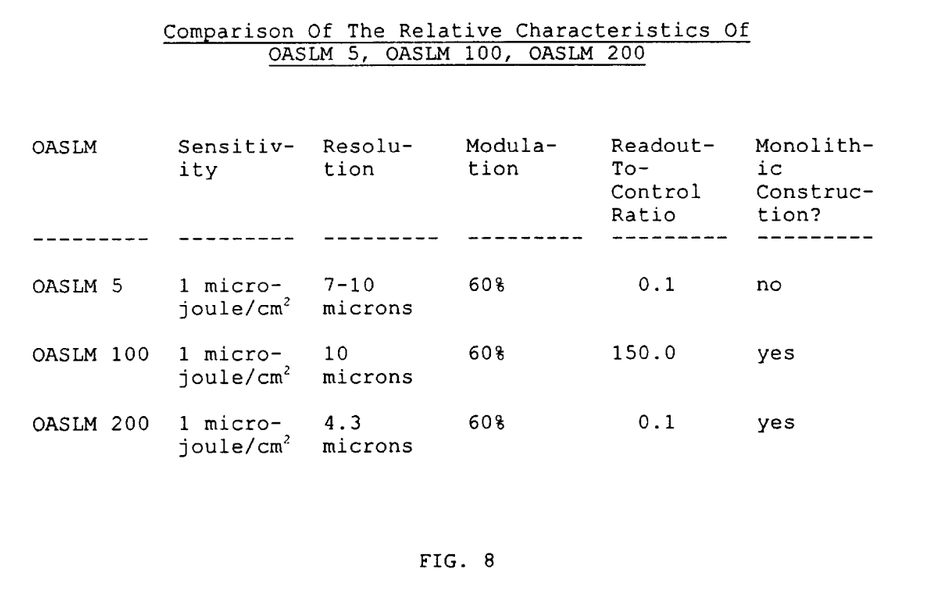
FIG. 8 is a table comparing the relative characteristics of the OASLM's of FIGS. 5, 6 and 7.

FIG. 8 shows a table comparing the relative characteristics of OASLM 5, OASLM 100 and OASLM 200.

OPTICAL PATTERN PROCESSOR

OASLM's constructed in accordance with the present invention have many applications.

Figure 9:
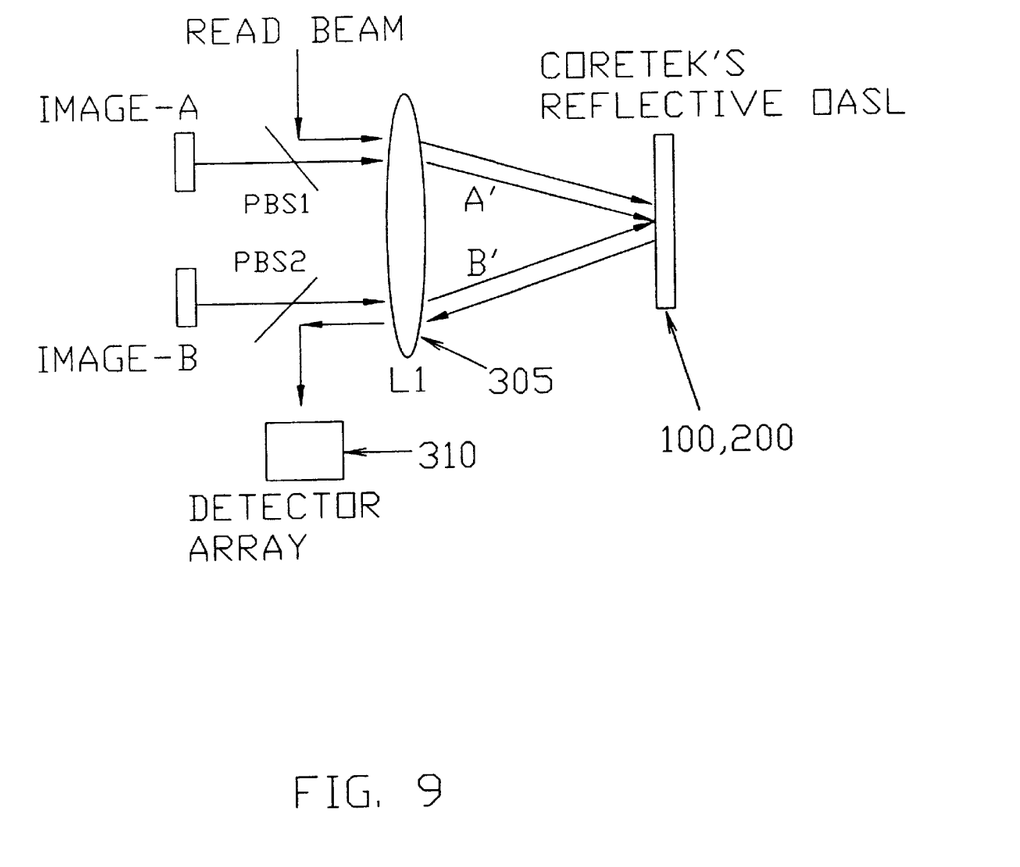
FIG. 9 is a schematic diagram illustrating a novel optical pattern processor constructed in accordance with the present invention.

For example, OASLM 100 or OASLM 200 may be incorporated into an optical pattern processor such as the optical pattern processor 300 shown in FIG. 9. Due to the unique construction of OASLM's 100 and 200, optical pattern processor 300 can be unusually compact, among other things.

Looking now at FIG. 9, optical pattern processor 300 is designed to compare two images A and B. Images A and B are first passed through a lens 305 which Fourier-transforms the images A and B into corresponding images A' and B', respectively. The transformed images A' and B' are then superimposed, at an angle, on OASLM 100 or OASLM 200, which creates an interference pattern with the combined superimposed image. Optically, the combined superimposed image can be considered to be $((A')^2+(B')^2+(A'*B')+(A'B'*))$, where $A'*$ and $B'*$ are complex conjugates. The combined, superimposed image $((A')^2+(B')^2+(A'*B')+(A'B'*))$ acts as the control on OASLM 100, 200. A readout beam is also directed at OASLM 100, 200 and is modulated by the combined, superimposed image $((A')^2+(B')^2+(A'*B')+(A'B'*))$. The output readout beam emerging from OASLM 100, 200 is then directed to a detector array 310. Detector array 310 is designed to look at the term (A'*B') or (A'B'*). As is well known in the art, if (A'*B')>0, or if (A'B'*)>0, then images A and B are the same; however, if (A'*B')=0 or if (A'B'*)=0, then the images A and B are not the same.

MODIFICATIONS OF THE PREFERRED EMBODIMENTS

Numerous modifications may be made to the preferred embodiments discussed above without departing from the scope of the present invention.

For example, with OASLM 100, mirror electrode 125 can be integrated with modulator region 120 if desired. Or a thin electron multiplication region, also known as an "avalanche multiplication region", can be incorporated into detector region 115 so as to increase the sensitivity of the OASLM, by increasing the number of free electrons generated by a given amount of control light. The thin electron multiplication region can be pixelated or non-pixelated, as preferred.

Or with OASLM 200, more or less than three repeating substructures 230 (i.e., buffer layer 210/electrooptic region 215/buffer layer 210) can be provided. Furthermore, within each substructure 230, the relative thicknesses of each buffer layer 210 and/or electrooptic region 215 can vary. Also, the thicknesses of various buffer layers 210, and/or various electrooptic regions 215, can vary throughout the overall device.

Or with either OASLM 100 and/or OASLM 200, the device can utilize a non-semiconductor mirror in place of semiconductor mirrors 125 and 220, respectively. Alternatively, OASLM 100 and/or OASLM 200 can be fabricated without a mirror (i.e., without mirrors 125 and 220, respectively); in this case, the OASLM's would require removal of substrates 130 and 225, respectively, so that the devices could operate as transmission, rather than reflective, devices.

Or optical pattern processor 300 could be constructed so that the input readout beam does not pass through lens 305, or so that the output readout beam is diffracted by a lens other than lens 305.

ADVANTAGES OF THE PRESENT INVENTION

Numerous advantages are achieved through the provision and use of the present invention.

For one thing, a novel OASLM is provided which has good lateral isolation between adjacent virtual pixels, so as to avoid cross-talk and achieve good device resolution.

And a novel OASLM is provided which has good sensitivity, so that a low-level light source can be used as the control.

In addition, a novel OASLM is provided which is relatively efficient, in the sense that the light modulator will absorb relatively little of the light which is to be modulated.

And a novel OASLM is provided which is able to provide a good degree of modulation, so as to deliver an output which is more easily discernible.

Also, a novel OASLM is provided which has a relatively high readout-to-control ratio, so that the light modulator's output can be more easily used and so that the intensity-related requirements of a following optical or electronic subsystem can be relaxed.

Furthermore, a novel OASLM is provided which is able to operate at a relatively high speed, so that the OASLM can be used in a broad range of device applications.

And a novel OASLM is provided which has a monolithic construction, so that the device can be more easily fabricated.

Also, a novel optical pattern processor is provided which utilizes a novel OASLM constructed in accordance with the present invention.

What is claimed is:

1. An optically addressed spatial light modulator (OASLM) comprising:
    a transparent electrode;
    a buffer layer adjacent to said transparent electrode;
    a detector region adjacent to said buffer layer; and
    a modulator region adjacent to said detector region;
    wherein said detector region and said modulator region are optically isolated from and resist electron movement between one another; wherein
    said detector region comprises a photoconductive semiconductor region or a semi-photoconductive semiconductor region with a higher band gap than said modulator region; and further wherein
    said modulator region comprises a low-photoconductive semiconductor material.

2. An optically addressed spatial light modulator (OASLM) according to claim 1 wherein:
    said detector region has a thickness sufficient to absorb substantially all of said control light entering the OASLM device, whereby said control light does not affect said modulator region; and further wherein
    said detector region is transparent to the readout beam, such that said readout beam does not affect said detector region.

3. An optically addressed spatial light modulator (OASLM) according to claim 1 wherein said OASLM further comprises:
    a mirror electrode disposed adjacent said modulator region, so that said modulator region is sandwiched between said detector region and said mirror electrode.

4. An optically addressed spatial light modulator (OASLM) according to claim 1 wherein said OASLM further comprises:
    a substrate disposed adjacent said mirror electrode, so that said mirror electrode is sandwiched between said modulator region and said substrate.

5. An optically addressed spatial light modulator (OASLM) comprising:
    a transparent electrode;
    a first buffer layer adjacent to said transparent electrode;
    a first detector/modulator region adjacent to said first buffer layer;
    a second buffer layer adjacent to said first detector/modulator region;
    a second detector/modulator region adjacent to said second buffer layer; and
    a third buffer layer adjacent to said second detector/modulator region.

6. An optically addressed spatial light modulator (OASLM) according to claim 5 wherein said OASLM further comprises:
    a mirror electrode disposed adjacent said third buffer layer, so that said third buffer layer is sandwiched between said second detector/modulator region and said mirror electrode.

7. An optically addressed spatial light modulator (OASLM) according to claim 5 wherein said OASLM further comprises:
    a substrate disposed adjacent said mirror electrode, so that said mirror electrode is sandwiched between said third buffer layer and said substrate.

8. A novel optical pattern processor comprising:
    an optically addressed spatial light modulator (OASLM) comprising:
        a transparent electrode;
        a buffer layer adjacent to said transparent electrode;
        a detector region adjacent to said buffer layer; and
        a modulator region adjacent to said detector region;
        wherein said detector region and said modulator region are optically isolated from and resist electron movement between one another;
    a lens for performing a Fourier-transformation of images A and B so as to produce transformed images A' and B', and for superimposing, at an angle, the transformed image $((A')^2+(B')^2+(A'^*B')+(A'B'^*))$ on said OASLM; and
    a detector array for analyzing the term $(A'^*B')$ or $(A'B'^*)$ of said superimposed transformed image.

9. A novel optical pattern processor comprising:
an optically addressed spatial light modulator (OASLM) comprising:
   a transparent electrode;
   a first buffer layer adjacent to said transparent electrode;
   a first detector/modulator region adjacent to said first buffer layer;
   a second buffer layer adjacent to said first detector/modulator region;
   a second detector/modulator region adjacent to said second buffer layer; and
   a third buffer layer adjacent to said second detector/modulator region;
a lens for performing a Fourier-transformation of images A and B so as to produce transformed images A' and B', and for superimposing, at an angle, the transformed image $((A')^2+(B')^2+(A'^*B')+(A'B'^*))$ on said OASLM; and
a detector array for analyzing the term $(A'^*B')$ or $(A'B^{*'})$ of said superimposed transformed image.

10. An optically addressed spatial light modulator (OASLM) comprising:
   a transparent electrode;
   a buffer layer adjacent to said transparent electrode;
   a detector region adjacent to said buffer layer; and
   a modulator region adjacent to said detector region;
   said detector region has a thickness sufficient to absorb substantially all of said control light entering the OASLM device, whereby said control light does not affect said modulator region; and further wherein
   said detector region is transparent to the readout beam, such that said readout beam does not affect said detector region.

11. An optically addressed spatial light modulator (OASLM) according to claim 10 wherein said OASLM further comprises:
   a mirror electrode disposed adjacent said modulator region, so that said modulator region is sandwiched between said detector region and said mirror electrode.

12. An optically addressed spatial light modulator (OASLM) according to claim 10 wherein said OASLM further comprises:
   a substrate disposed adjacent said mirror electrode, so that said mirror electrode is sandwiched between said modulator region and said substrate.

* * * * *